No. 833,067. PATENTED OCT. 9, 1906.
R. H. LING.
AUTOMATIC SAFETY BRAKE FOR TREAD POWERS.
APPLICATION FILED APR. 17, 1906.
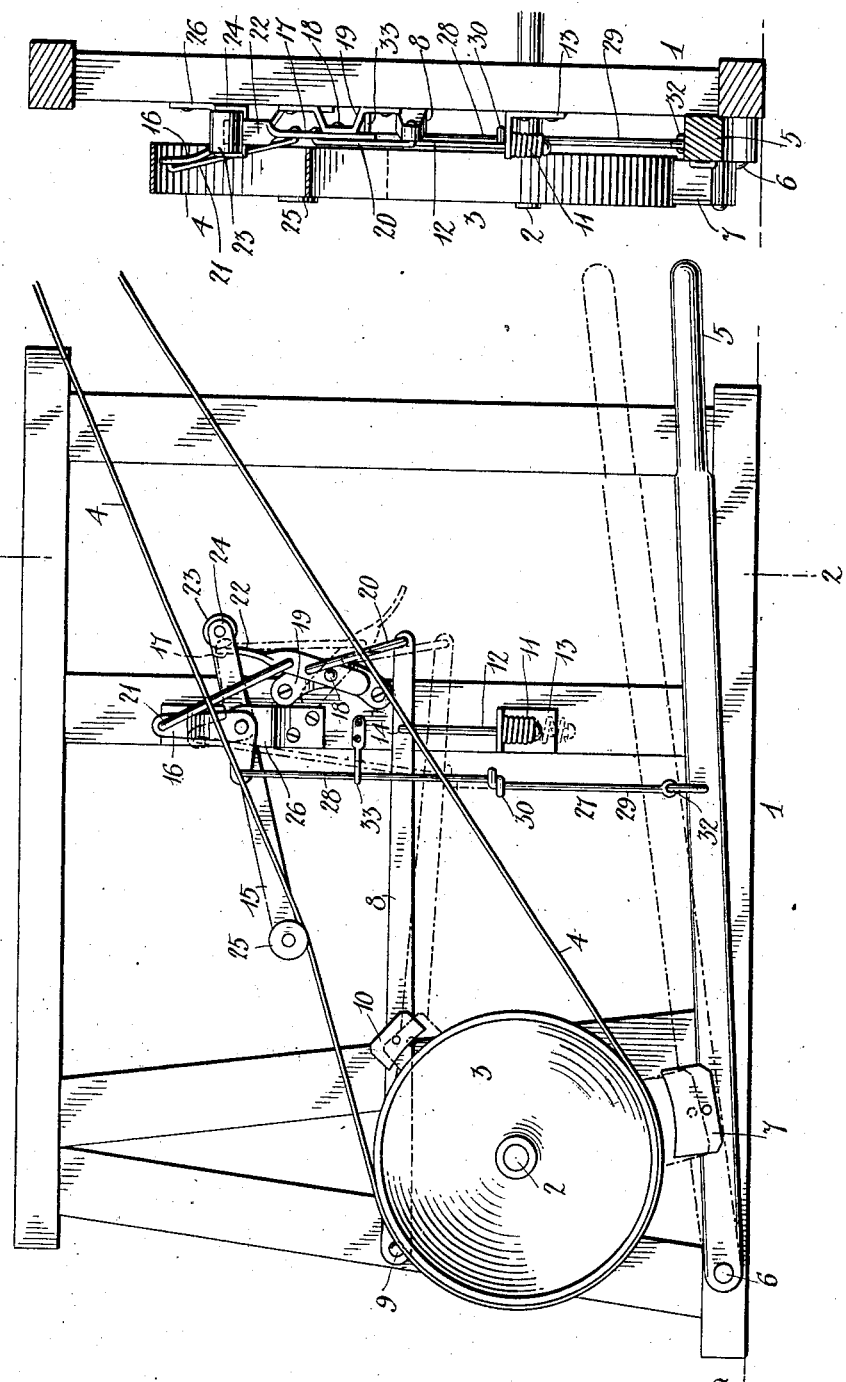
Witnesses
Inventor
Robert H. Ling
by
Attorneys

UNITED STATES PATENT OFFICE.

ROBERT H. LING, OF WEHRUM, PENNSYLVANIA.

AUTOMATIC SAFETY-BRAKE FOR TREAD-POWERS.

No. 833,067.  Specification of Letters Patent.  Patented Oct. 9, 1906.

Application filed April 17, 1906. Serial No. 312,205.

*To all whom it may concern:*

Be it known that I, ROBERT H. LING, a citizen of the United States, residing at Wehrum, in the county of Indiana and State of Pennsylvania, have invented certain new and useful Improvements in Automatic Safety-Brakes for Tread-Powers; and I do declare the following to be a full, clear, and exact description of the invention, such as will enable others skilled in the art to which it appertains to make and use the same.

My invention relates to improvements in automatic safety-brakes for tread-powers used in operating threshing-machines and other machinery.

The object of the invention is to provide a simple and practical brake device of this character which will instantly and automatically stop the whole machine should the driving-belt break or fly off.

With the above and other objects in view the invention consists of certain novel features of construction, combination, and arrangement of parts hereinafter described and claimed.

In the accompanying drawings, Figure 1 is a side view of a portion of the frame of a tread-power, showing the application of my improved automatic safety-brake thereto, the parts being shown in their normal position in full lines and in their operated or set position in dotted lines; and Fig. 2 is a detail vertical sectional view taken on the plane indicated by the line 2 2 in Fig. 1.

Referring to the drawings by numerals, 1 denotes a portion of the frame of a tread-power which is adapted for use in operating threshing-machines and other machinery and which may be of any desired form and construction. This frame, as shown, consists of upper and lower horizontal beams connected by uprights upon which my improved brake mechanism is mounted. The main shaft 2 of the tread-power projects through a suitable bearing provided between two of the converging uprights, and upon its outer end is secured a combined band and brake wheel 3, which is connected by a driving belt or band 4 to the usual belt wheel or pulley (not shown) of the threshing-machine or other machinery to be operated by the tread-power. The tread-power is provided with the usual hand-brake lever 5, which is pivoted at 6 upon the frame 1 and carries a brake-shoe 7 to engage the brake-surface of the wheel 3; but my improved automatic safety-brake mechanism comprises an additional brake-lever 8, which is pivoted at 9 upon the frame and also carries a brake-shoe 10 to engage the brake or friction surface of the wheel 3. The brake-lever 8 is actuated downwardly for the purpose of causing its shoe to frictionally engage the wheel by means of a coiled spring 11, which surrounds a rod or link 12 between a head upon its lower end and a right-angular bracket 13, secured upon one of the uprights of the frame 1. This rod or link slides through an opening in said bracket and has its upper end loosely or pivotally connected to the lever 8, as shown at 14.

The lever 8 is held elevated or in its normal position, so that its shoe is out of contact with the brake-wheel, by a trip device which is actuated automatically when the belt 4 breaks or slides off of its pulley. This trip mechanism comprises a latch-lever 15, a bell-crank 16, and a trip-lever 17. The latter is pivoted at 18 in a bracket 19 upon one of the uprights of the frame 1 and is connected by pivot-links 20 21 to the free end of the lever 8 and one arm of the bell-crank 16, respectively, the ends of said links 20 21 being pivotally connected to the same arm or end of the lever 17 at points unequally distant from its pivot. Said end of the lever 17 is formed with a tongue 22, which is adapted to engage a roller 23, provided in the forked end 24 of the latch-lever 15. The opposite end of the latter carries a roller 25, which rests and turns normally upon the upper stretch of the belt or band 4, as clearly shown in full lines in Fig. 1 of the drawings, so that the engagement of the roller 23 with the tongue or end 22 of the lever 17 will hold the parts in their full-line position in said figure and retain the brake-shoe 10 out of contact with the brake-wheel 3 against the tension of its actuating-spring 11. It will be seen that whenever the belt 4 breaks or slips off of its pulleys the end of the latch-lever 15, which carries the roller 25 and which is heavier than its forked end, will drop and cause the roller 23 to free the trip-lever 17, so that the coiled spring 11 will pull the parts to the dotted-line position shown in Fig. 1, and thus instantly and automatically apply the brake-shoe 10 to the wheel 3. The latch-lever 15 is pivoted in a bracket 26 upon the frame 1 and concentric with the bell-crank 16, the other arm of which is loosely connected to the hand-brake lever 5 by a link connection 27, which consists of upper and lower links 28 29, having a sliding connection with each other at 30, the upper link being pivoted to the bell-crank and the lower link to a loop or eye 32 upon the lever 5. A guide 33 is provided upon one of the uprights of the frame 1 for the upper link, as shown in Fig. 1. By thus connecting the bell-crank to the lever 5 it will be seen that the mechanism may be automatically set by depressing the latter.

The construction, operation, and advantages of the invention will be readily understood from the foregoing description, taken in connection with the accompanying drawings.

It will be seen that the safety-brake will be instantly and automatically applied should any accident happen when the machine is in motion and it is necessary to quickly shut down the power. Without this device it requires some minutes to stop the machine by the use of the ordinary hand-brake 5.

Various changes in the form, proportion, and the minor details of construction may be resorted to without departing from the principle or sacrificing any of the advantages of the invention as defined by the appended claims.

Having thus described my invention, what I claim as new, and desire to secure by Letters Patent, is—

1. The combination with a tread-power having a frame, a driving and brake wheel and a belt passed around said wheel, of a brake-lever carrying a shoe to coact with the brake-surface of said wheel, means for operating said brake-lever to apply its shoe to said wheel, a trip-lever, a connection between the latter and said brake-lever, a latch-lever having one end supported upon said belt and its other end engaged with said trip-lever, a bell-crank, a connection between said bell-crank and said trip-lever, a second brake-lever having a shoe to coact with said brake-wheel, and a connection between said bell-crank and said second brake-lever, substantially as described.

2. The combination with a tread-power having a frame, a driving and brake wheel and a belt passed around said wheel, of a brake-lever carrying a shoe to coact with the brake-surface of said wheel, a spring for actuating said brake-lever to apply its shoe to said wheel, a bell-crank, a trip-lever, links connecting said trip-lever to said brake-lever and said bell-crank, a latch-lever, a roller upon the overbalanced end of said latch-lever to engage said belt, a roller upon the opposite end of said latch-lever adapted to engage one end of said trip-lever, a second lever, and a loose link connection between said second lever and said bell-crank, substantially as described.

In testimony whereof I have hereunto set my hand in presence of two subscribing witnesses.

ROBERT H. LING.

Witnesses:
F. C. SHARBAUGH,
PHILIP N. SHETTIG.